(12) United States Patent
Taghaddos

(10) Patent No.: US 6,341,813 B1
(45) Date of Patent: Jan. 29, 2002

(54) ENERGY-ABSORBING MEMBERS IN A VEHICLE

(76) Inventor: Hamid Taghaddos, Al Borj Medical Centre, P.O. Box 23719, Dubai (AE)

( * ) Notice: Subject to any disclaimer, the term of this patent is extended or adjusted under 35 U.S.C. 154(b) by 0 days.

(21) Appl. No.: 09/611,551

(22) Filed: Jul. 7, 2000

(51) Int. Cl.[7] ............................................... B60R 21/00
(52) U.S. Cl. ...................................... 296/189; 293/107
(58) Field of Search .............................. 296/189, 188; 293/107

(56) References Cited

U.S. PATENT DOCUMENTS

| | | | |
|---|---|---|---|
| 3,689,054 A | * | 9/1972 | Gouirand ................. 293/107 X |
| 3,774,948 A | * | 11/1973 | Gouirand ..................... 293/107 |
| 3,822,908 A | * | 7/1974 | Gouirand ..................... 293/107 |
| 4,061,385 A | * | 12/1977 | Schwartzberg .............. 293/107 |
| 4,995,659 A | * | 2/1991 | Park ............................ 293/107 |
| 5,131,703 A | * | 7/1992 | Stirling .................. 293/107 X |
| 5,810,427 A | * | 9/1998 | Hartmann et al. .......... 296/189 |

* cited by examiner

Primary Examiner—Joseph D. Pape
(74) Attorney, Agent, or Firm—William Nitkin

(57) ABSTRACT

A method is disclosed of improving the structural integrity of a motor vehicle by providing one or more inflated bags within open spaces within the structural framework of such vehicle which inflated bags provide impact cushioning to such vehicle.

2 Claims, 1 Drawing Sheet

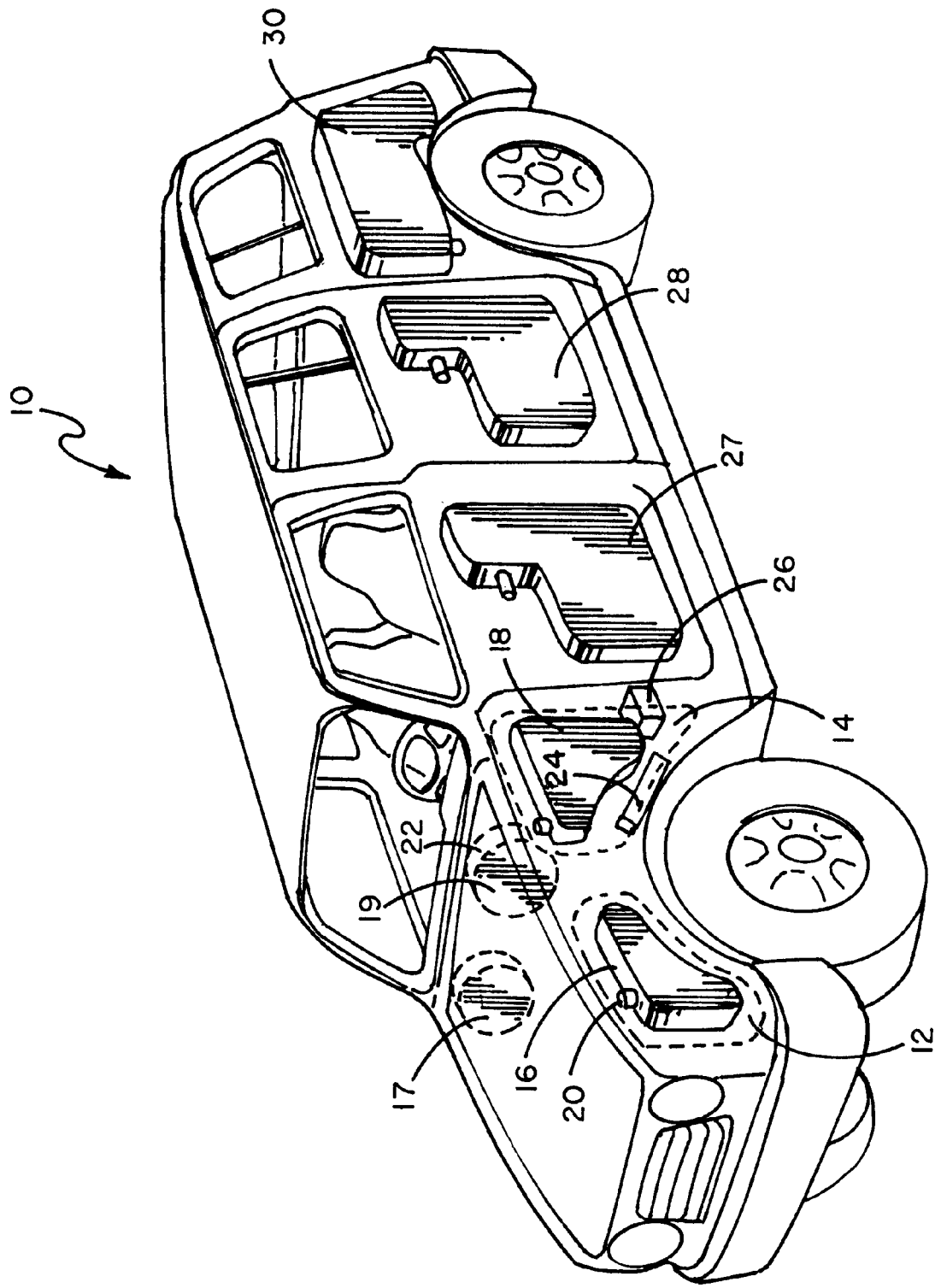

ENERGY-ABSORBING MEMBERS IN A VEHICLE

BACKGROUND OF THE INVENTION

1. Field of the Invention

The structure and method of this invention reside in the area of impact absorption in motor vehicles and more particularly relate to a system of inflated bags positioned within the framework of a motor vehicle to help the vehicle absorb impact energy thereagainst in an accident.

2. History of the Prior Art

In the prior art the use of inflatable air bags which inflate upon vehicle impact within the passenger compartment of a vehicle is well known. These inflatable air bags help protect the occupants of the vehicle from injury. The use of air within chambers within a bumper of a vehicle is taught in U.S. Pat. No. 3,695,665 to Matsuura and U.S. Pat. No. 3,689,054 to Gouirand. A system of deploying a plurality of air bags around the exterior of a vehicle is also known in the prior art which air bags, upon the detection of a collision, inflate outside the vehicle to protect the vehicle from damage, such as taught in U.S. Pat. No. 5,646,613 to Cho and U.S. Pat. No. 5,732,785 to Ran et al.

SUMMARY OF THE INVENTION

It is an object of this invention to provide additional protection beyond the air cushioning effects of the use of airbags in the prior art. The airbags in the prior art generally tend to be positioned on the exterior, or within the interior, of the passenger compartment of a vehicle for the protection of the vehicle or protection of the occupants. In the present invention inflated bags are positioned within the framework structure of a vehicle where they remain permanently inflated to help absorb any impact that might be made against the vehicle in the vicinity of such inflated airbags. Each vehicle in the methodology of this invention would be studied to determine areas within the vehicle where there is open space between the structural framework components of the vehicle. Within each such open spaces or a portion thereof will be positioned an airbag of this invention such that once inflated it will conform to the shape of such space within the framework structure of the vehicle and then act as additional cushioning to any impact against the vehicle. The advantage of the system of this invention is that the improved impact absorption and cushioning provided by the inflated airbags is such that the force of any impact on the vehicle will be lessened as the resiliency of the bags will help absorb the impact and lessen internal movement of portions of the structural framework of the vehicle being impacted, thereby lessening damage to the vehicle and injury to its occupants due to an impact. Further, the inflated bags of this invention, being gas-filled, are extremely light in weight and will not add any significant weight to the vehicle, and the invention will aid in protecting the occupants of the vehicle from a variety of impacts depending upon where such inflated airbags are positioned within the framework of the vehicle. Such framework-contained inflated airbags will also act to mute road noise to the benefit of the vehicle's occupants. The inflated airbags, when placed within the open space area of a dashboard or open space areas within doors, help protect the occupants of the vehicle and make the vehicle more crash-worthy.

BRIEF DESCRIPTION OF THE DRAWINGS

The FIGURE illustrates a perspective view of the inflated airbag system of this invention in use within a motor vehicle.

DESCRIPTION OF THE PREFERRED EMBODIMENT(S)

FIG. 1 illustrates a perspective view of vehicle 10 seen with certain exterior framework shown cutaway so that the interior of the structural framework can be observed. It should be noted that the inflatable airbag of this invention can be installed in any type of vehicle and is not limited only to the type illustrated. Although the inflatable airbag of this invention can be inflated with air or a gas, for ease of reference it will be referred to as an airbag. The vehicle can be a passenger vehicle, a commercial, or other type of vehicle. The general methodology of this invention can be applied to any kind of motor vehicle which possesses open spaces within its structural framework in which open spaces can be disposed airbags of this invention which, when inflated, will conform to the shape of the space in which it is positioned within the vehicle. Such inflated airbags will act as additional cushioning protection to the vehicle from external impact against the vehicle or impact by the vehicle against another object. Seen in this view is first open space 12 and second open space 14. Such open spaces are normally formed during the construction of a vehicle within the various parts of the vehicle such as the front portion, fenders, doors, rear portion, around the trunk area, etc. Within first open space 12 is disposed first bag 16 which can be inflated to conform to the shape of the space by air or gas being delivered through first valve 20 which can be resealed once first bag 16 is fully inflated within the space in which it has been positioned. In the same manner second bag 18 can be inflated within second open space 14 by air being directed through second valve 22 such that second bag 18, when inflated within the structural members, conforms to the space within the vehicle, such as above first structural member 24 and second structural member 26. Open spaces within the vehicle can be found throughout the vehicle including, for example, within the dashboard area where bags 17 and 19 are shown in dashed lines. The bags of this invention can be made of a strong plastic material and can be preformed in a variety of shapes to aid in conforming to open spaces within a vehicle or they can be merely balloon-like bags which when inflated will conform to the shape of any open space that they fill. One must utilize an amount of pressure that will inflate the airbag but not so much that it will provide force against the vehicle from the interior which might otherwise damage the vehicle. When properly inflated, the airbags of this invention can be positioned within many open spaces within the structural framework of a vehicle. Bag 28 and bag 30 are depicted in odd shapes to conform to the open spaces within the vehicle's doors to provide resilient cushioning within the doors against impact on the exterior of the door. The airbags of this invention can provide additional soundproofing within the vehicle as well as insulation to prevent loss of heat or loss of cooling within the passenger compartment of the vehicle. For reasons as discussed above it is advantageous to utilize as many airbags of this invention in as many open spaces in the vehicle's structural framework as possible so as to provide the most resilient cushioning possible against external impact.

Although the present invention has been described with reference to particular embodiments, it will be apparent to those skilled in the art that variations and modifications can be substituted therefor without departing from the principles and spirit of the invention.

I claim:

1. A method for providing improved structural integrity to an already constructed motor vehicle, such preexisting vehicle being of the type having a plurality of open spaces of various sizes and shapes formed within its structural framework during its construction, comprising the steps of:

determining the location of said open spaces within the structural framework of said vehicle;

providing at least one bag, said bag having means to seal such bag once inflated with a gas;

positioning said bag within at least one of said open spaces in said structural framework of said vehicle;

inflating said bag with a gas for conforming said bag to the shape and size of said open space in said vehicle;

sealing said bag to retain said gas therein;

providing impact cushioning to said vehicle by the placement of said gas-filled bag therein; and lessening internal movement of said structural framework during impact by the cushioning action of said inflated bag.

2. The method of claim 1 further including the steps of:

providing a plurality of said bags, each positioned within a selected one of said plurality of open spaces formed within said preexisting structural framework of said vehicle;

inflating said bags with a gas for conforming said bags to the shapes and sizes of said open spaces in said vehicle;

sealing said bags to retain said gas therein;

providing impact cushioning to said vehicle by the placement of said gas-filled bags therein; and lessening internal movement of said structural framework during impact by the cushioning action of said inflated bags.

\* \* \* \* \*